United States Patent [19]

Baron

[11] 4,417,746
[45] Nov. 29, 1983

[54] KICKSTAND FOR A MOTORCYCLE

[75] Inventor: Günter Baron, Neuestubg, Fed. Rep. of Germany

[73] Assignee: Bayerische Motoren Werke AG, Fed. Rep. of Germany

[21] Appl. No.: 339,451

[22] PCT Filed: Apr. 30, 1981

[86] PCT No.: PCT/EP81/00035
§ 371 Date: Jan. 4, 1982
§ 102(e) Date: Jan. 4, 1982

[87] PCT Pub. No.: WO81/03155
PCT Pub. Date: Nov. 12, 1981

[30] Foreign Application Priority Data
May 2, 1980 [DE] Fed. Rep. of Germany ....... 3016865

[51] Int. Cl.³ .............................................. B62H 1/02
[52] U.S. Cl. .................................. 280/301; 280/763.1
[58] Field of Search ............... 280/293, 295, 298, 301, 280/763; 180/219

[56] References Cited

U.S. PATENT DOCUMENTS

| | | | |
|---|---|---|---|
| 293,284 | 2/1884 | Stevens | 280/301 |
| 3,345,681 | 10/1967 | Pletscher | 280/301 |
| 3,918,743 | 11/1975 | Sato et al. | 280/301 |
| 4,073,505 | 2/1978 | Yamazaki | 280/293 |
| 4,241,933 | 12/1980 | Gratza et al. | 280/301 |

FOREIGN PATENT DOCUMENTS

| | | |
|---|---|---|
| 302058 | 9/1972 | Fed. Rep. of Germany . |
| 2453870 | 5/1975 | Fed. Rep. of Germany ...... 280/301 |
| 2632824 | 2/1977 | Fed. Rep. of Germany . |
| 2721180 | 11/1978 | Fed. Rep. of Germany . |
| 2431415 | 2/1980 | France . |
| 432270 | 9/1967 | Switzerland . |
| 21369 | of 1896 | United Kingdom ................. 280/301 |

Primary Examiner—Joseph F. Peters, Jr.
Assistant Examiner—Kenneth R. Rice
Attorney, Agent, or Firm—Craig & Burns

[57] ABSTRACT

A kickstand device is disclosed. The device includes a kickstand articulated to the frame of a motorcycle by means of a ball joint, in such fashion that its free end is displaceable upward and downward relative to the motorcycle within a limited range of angles. In addition, the kickstand is displaceable against the action of two extension springs from a swung-in travel position through a dead center point of the springs into a swung-out parking position. The lengthwise extent of the kickstand is adjusted so that when the motorcycle is standing vertical, the free end of the kickstand is in contact with the ground. If the motorcycle rider forgets to swing in the kickstand when he starts his motorcycle, this device ensures that the kickstand will drag for a relatively short distance, whereupon the kickstand will swivel rearward through the dead center point of extension springs and will finally be swung in completely by the springs.

5 Claims, 3 Drawing Figures

KICKSTAND FOR A MOTORCYCLE

The invention relates to a kickstand device for a motorcycle device is disclosed. The device includes a kickstand to the frame comprising a kickstand and means for articulating the kickstand of the motorcycle so that the kickstand is swivelable against the action of at least one spring from a swung-in travel position through a dead center position of the springs into a swung-out parking position with the free end of the kickstand, in the parking position, being displaceable upward relative to the motorcycle against the force of the springs under the influence of the load imposed by the motorcycle.

The "V 1000 I-CONVERT" motorcycle built by MOTO GUZZI is equipped with a kickstand device of this type. In this motorcycle, the end segment of the kickstand at the articulation is designed as a bent bearing pin, received by a rubber sleeve. The latter sleeve is surrounded by a mounting yoke attached to the motorcycle frame. When the kickstand abuts the ground in the parking position, the lengthwise center plane of the motorcycle is swiveled slightly laterally under the influence of its weight, within the scope of the elasticity of the rubber sleeve. In this position, the kickstand is then immobilized by two locking pins projecting outward from the motorcycle frame, the locking pins cooperating with a projection extending radially from the bearing pin of the kickstand. When the motorcycle is raised to the travel position, on the other hand, the free end segment of the kickstand is displaced toward the motorcycle frame by the force of the extension spring as well as the resilient effect of the rubber sleeve, pretensioned in the parking position, thus eliminating the immobilization of the kickstand, whose free end is above the ground at this time. Finally, the kickstand must be swung into the travel position by muscular force. In order to prevent the rider from forgetting to do this, since riding with the kickstand extended could result in a dangerous situation, the motorcycle is equipped with a device which prevents the engine from starting with the kickstand swung out. However, this device is relatively complex in design and is therefore expensive to manufacture.

The kickstand device disclosed in German AS 24 53 870 is provided at its free end segment with an auxiliary element of a different type, which extends beyond the free end of the kickstand in the travel position but is swung out laterally in the parking position under the influence of the weight of the motorcycle. When the rider forgets to swing in the kickstand when starting the motorcycle, this device is intended to cause the auxiliary element to rub along the ground and to swing in the kickstand as a result of the frictional contact which occurs. However, the mounting of the different auxiliary elements requires a relatively high construction cost, thus making this device expensive to produce. Furthermore, the auxiliary element made of a rubber block, can become brittle and thus useless after being used for a long time, as a result of the aging of the rubber. However, the rubber block at least tends to develop residual deformation when the kickstand is left in the parking position for a long time, or can wear away after extensive use, thereby having a deleterious effect on its function.

Hence, the goal of the invention is to provide a kickstand device of the aforementioned type with minimum manufacturing and parts cost, such that the kickstand swings in automatically when the motorcycle starts if the rider forgets to swing in the kickstand himself.

The goal of the invention is achieved by virtue of the fact that the kickstand is in contact with the ground in the lower extreme position of the range of angles when the motorcycle is standing vertical. The design of the range of angles for the kickstand according to the invention relative to the motorcycle frame causes the kickstand always to be pulled toward the motorcycle frame by spring force, so that when the motorcycle starts, the frictional contact with the ground causes the kickstand to rub along the ground for a relatively short distance, thereby swinging into the area of the lower dead center position of the springs, whence the kickstand is swung completely into the travel position by the force of the pretensioned extension springs. The kickstand device according to the invention is therefore simple and consequently economical from the manufacturing standpoint, in addition to being operationally safe.

The design of the invention provides for making the kickstand in the form of a fork in its end section at the articulation, and articulating it to a receiving part by means of a hinge pin mounted in a receiving bore in the fork, the receiving part being fastened to the motorcycle frame, and wherein the legs of the fork have play relative to the corresponding abutting surfaces of the receiving part. This design makes the articulation point of the kickstand spatially compressed and attractive in design.

According to a disclosed preferred embodiment of the invention, the hinge pin bears a spherical ring which is mounted with zero play in the axial direction of said hinge pin, between the two legs of the fork, the spherical ring in turn being received by an appropriately spherical bearing surface of the receiving part. This design of the articulation means that the kickstand is mounted permanently and largely maintenancefree.

As an additional feature of the disclosed embodiment of the invention, the receiving part projects between the legs of the fork and in the parking position of the kickstand abuts the two fork legs under the load imposed on the kickstand by the motorcycle. In this embodiment, the springs include two springs associated with the kickstand, which are disposed on the side of the kickstand which faces the lengthwise center plane of the motorcycle. The fork leg facing the springs is beveled at an acute angle on the inside face of its free end segment, beginning at the center of the hinge pin receiving bore, and the free end segment of the receiving part is beveled at the same angle, beginning at the center of the spherical bearing surface on its abutting surface, which faces away from the beveled fork leg.

In another form of the invention, the kickstand can be articulated in the receiving part by means of a compensating roller bearing, instead of a spherical ring, mounted on the hinge pin. As a further variation of the invention, the kickstand can be mounted on the hinge pin with radial plate.

The drawing shows one embodiment of the invention.

Figure 1:
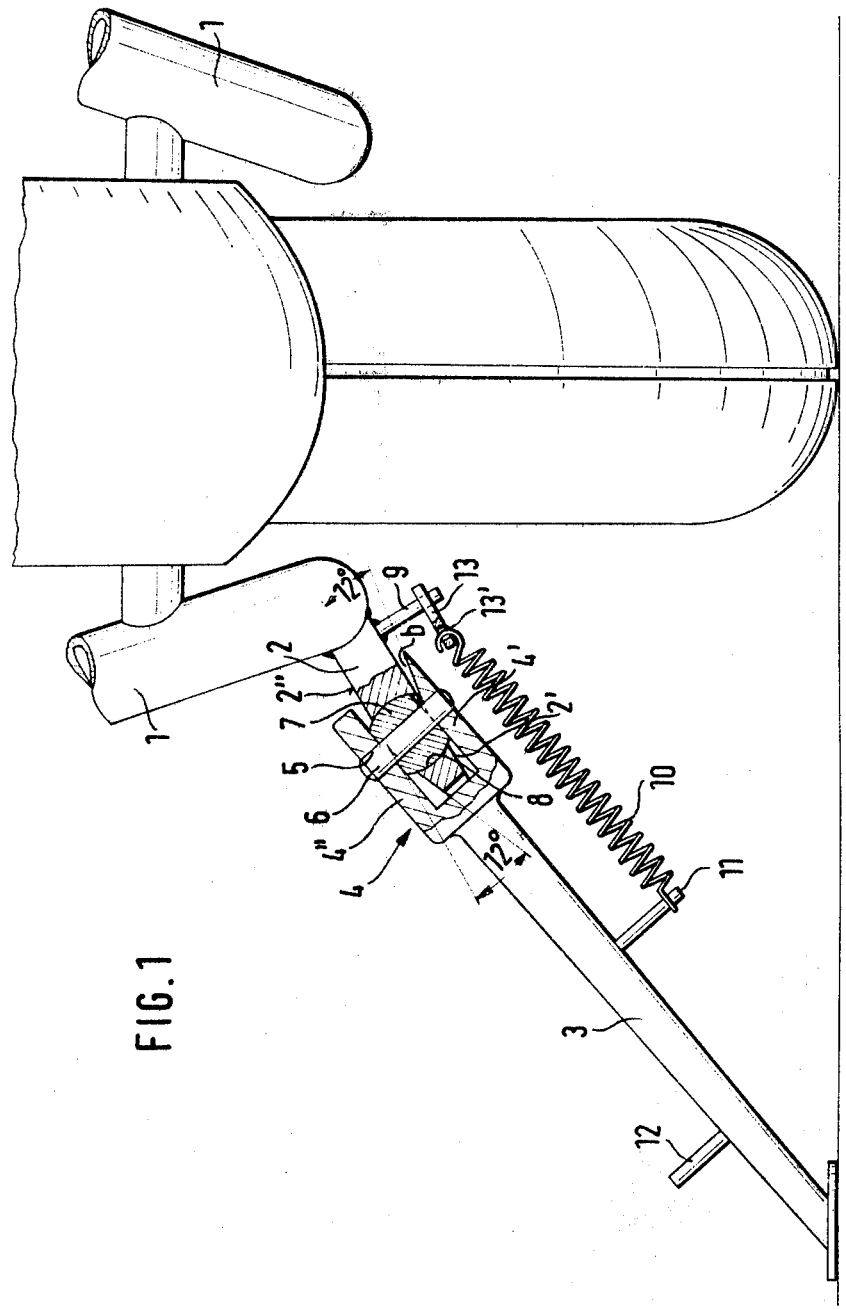
FIG. 1 is a partial view of a motorcycle standing vertical, with a kickstand in the parking position.
Figure 2:
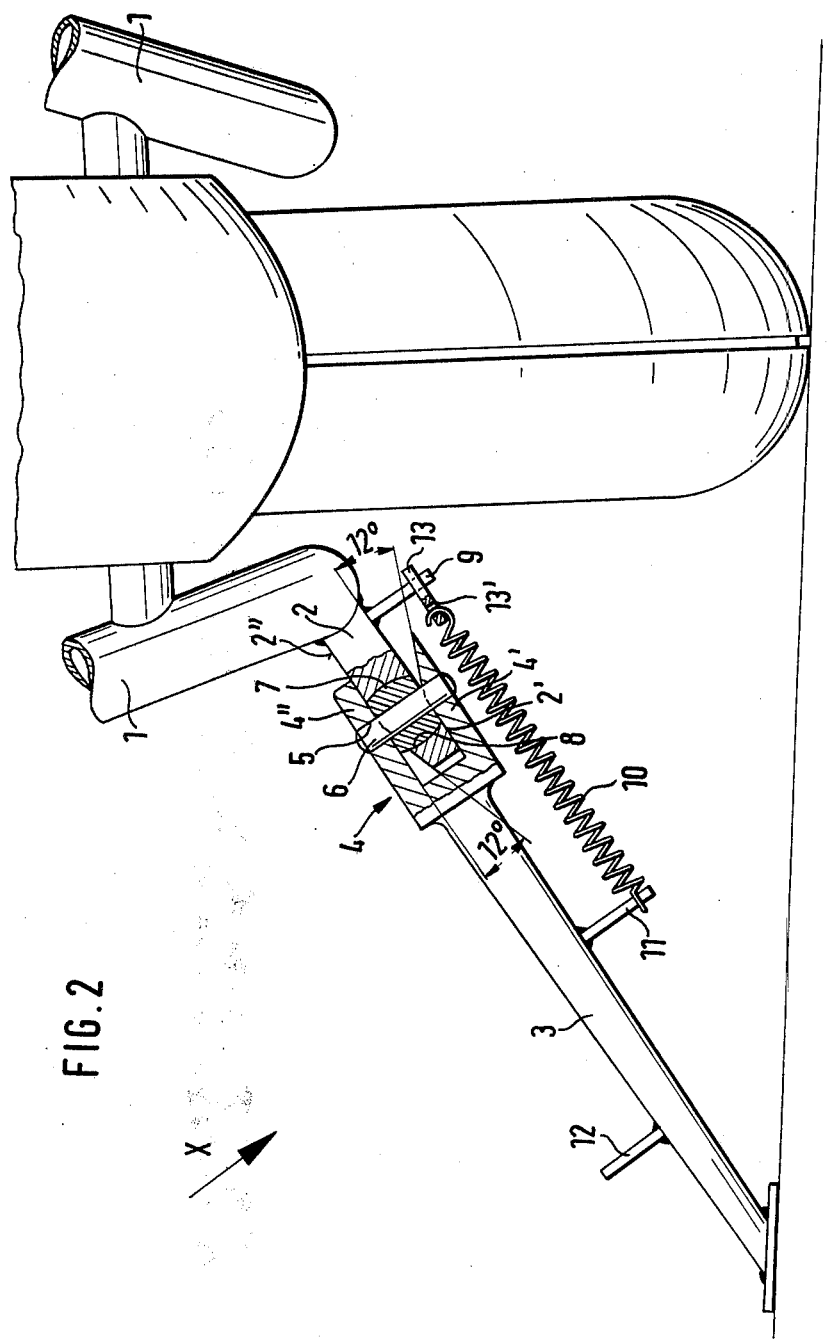
FIG. 2 shows the motorcycle tilted to the side, in a position in which it is supported on the kickstand.
Figure 3:
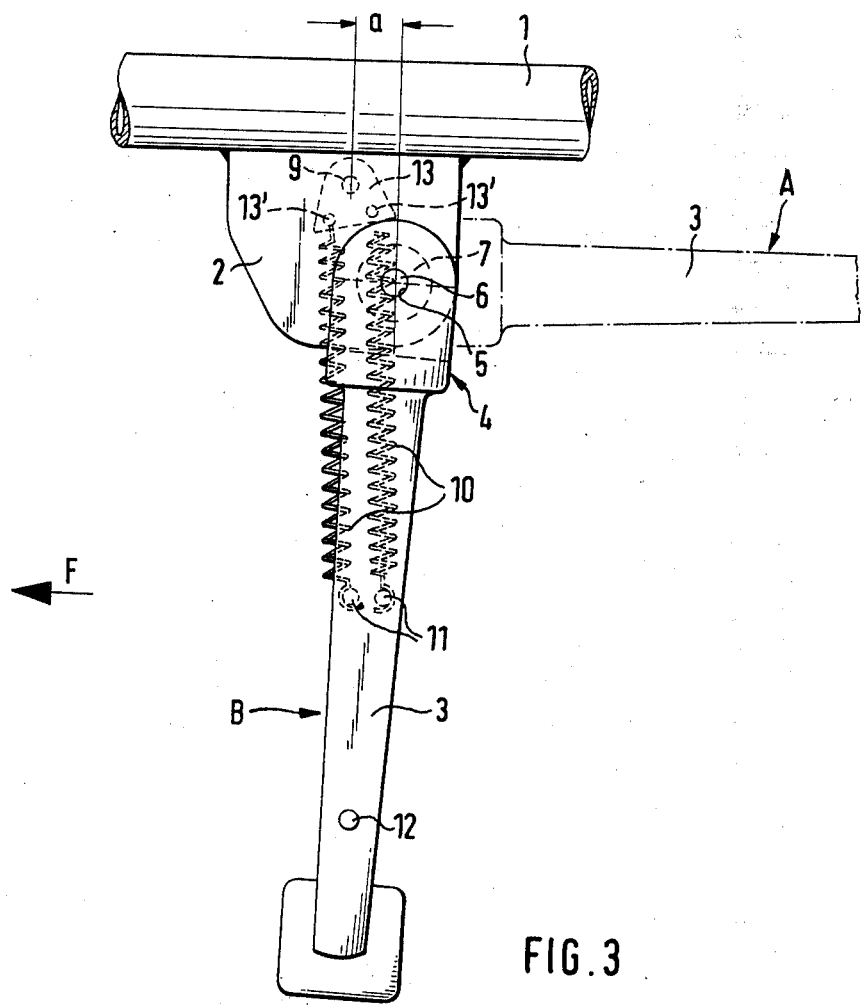
FIG. 3 is a view of the kickstand in the direction of arrow X in FIG. 2.

Referring now to the drawings, it is seen that a receiving part 2 is welded to frame 1 of a motorcycle, shown partially in FIGS. 1 to 3, so that it projects downward in a diagonal plane. A kickstand 3 is articulated to receiving part 2, the end segment of the kickstand at the articulation being in the form of a fork 4. The two legs 4', 4" of fork 4 are provided with a receiving bore 5 which runs at right angles to the length of kickstand 3, in which bore a hinge pin 6 is firmly fitted. Pin 6 rotatably bears a spherical ring 7, the ring being fitted with zero play in the axial direction of hinge pin 6 between fork legs 4', 4". Spherical ring 7 in turn is received by bearing surface 8 provided in receiving part 2, the surface being made spherical to conform to the spherical surface of spherical ring 7.

Fork leg 4', which faces springs 10, is beveled at an angle of 12° at the inside face of its free end segment, beginning at the center of receiving bore 5 of hinge pin 6. In addition, the free end segment of receiving part 2, beginning at the center of spherical bearing surface 8, is likewise beveled at an angle of 12° on its abutting surface to 2" facing away from beveled fork leg 4'. As is evident from FIG. 3, a bearing pin 9, to whose free end a retaining plate 13 is swivelably mounted, is provided on receiving part 2 above the articulation of kickstand 3 and projects outward at right angles therefrom (looking in the direction of Travel F), displaced by a distance a relative to the center of receiving bore 5 toward the leading edge of receiving part 2. The plate 13 is equipped with two eyes 13', to which two parallel springs 10, acting as extension springs, are fastened, the springs having their opposite ends attached with pretension to two cross pins 11 fastened to the shaft of kickstand 3 and projecting therefrom at right angles. The provision of two parallel-acting springs 10 also temporarily ensures the swivelability of kickstand 3 if one of the two springs 10 should break.

Kickstand 3 is swiveled from the travel position A indicated by the dot-dashed lines to the parking position B by muscular force, for which purpose pin 12 is provided. The fact that the bearing pin 9 of retaining plate 13 which receives springs 10 on receiving part 2 is provided at a distance a from the center of receiving bore 5 ensures that when kickstand 3 is swung out (from travel position A to parking position B), the kickstand is held in parking position B by spring force after it exceeds the dead center position of springs 10, whereby springs 10 are in an above-dead-center position, while fork 4 of kickstand 3 cooperates with receiving part 2 in the manner of a stop. Springs 10 have their effectiveness so tuned to one another that when kickstand 3 is swung from parking position B to travel position A, spring 10, which initially moves from the above-dead-center position to the below-dead-center position, as kickstand 3 swings, swings its adjacent spring 10 into the area of the below- dead-center position.

As FIG. 1 shows, with the motorcycle standing vertical, kickstand 3, swung out into parking position B, is displaced toward the lengthwise center plane of the motorcycle as a result of the force of pretensioned springs 10 within the bevel provided by the free end segment of fork leg 4' and the bevel on receiving part 2, whereby the lengthwise extension of kickstand 3 is set so that its free end is in contact with the ground. This design for the angular displacement of kickstand 3 according to the invention ensures that if the rider forgets to swing the kickstand inward to travel position A, when the motorcycle starts the kickstand will drag for a relatively short distance over the ground as a result of the frictional contact existing with the ground. This causes kickstand 3 to swing rearward, slightly beyond the dead center position of springs 10, and then into the area of the below-dead-center position, whereby the kickstand is swung into its travel position A by the force of pretensioned springs 10 which then act upon it. As is shown in FIG. 1, when kickstand 3 is in parking position B an air gap b in the form of an acute angle exists between the abutting surface 2' of receiving part 2 and the facing bevel of fork leg 4'. This arrangement ensures that when the motorcycle is standing vertical, the free end of kickstand 3 is always pulled against the ground by the force of springs 10.

When the motorcycle is tilted from the vertical position (travel position) shown in FIG. 1 to support it laterally by resting it on kickstand 3 (FIG. 2), receiving part 2 swivels about spherical ring 7 until abutting surface 2' of the free end segment of receiving part 2 abuts fork leg 4' and abutting surface 2" abuts fork leg 4", while kickstand 3 is simultaneously displaced slightly from the lengthwise center plane of the motorcycle against the force of springs 10.

Instead of spherical ring 7, kickstand 3 can also be articulated in receiving part 2 by means of a compensating roller bearing mounted on hinge pin 6. It is also possible for kickstand 3 to be mounted on hinge pin 6 with radial play, whereby fork legs 4' and 4" are located at a distance from the corresponding abutting surfaces 2', 2" of receiving part 2.

I claim:

1. A kickstand device for a motorcycle comprising a kickstand and means for articulating said kickstand to a frame of the motorcycle so that the kickstand is swivelable against the action of at least one spring from a swung-in travel position through a dead center point of the springs into a swung-out parking position with the free end of the kickstand, in the parking position, being displaceable upward relative to the motorcycle against the force of the springs over a limited angle range, characterized in that the kickstand is in contact with the ground in the lower extreme position of the angle range when the motorcycle is in a vertical position.

2. A kickstand device according to claim 1, wherein said kickstand is formed at an end segment with a fork having two fork legs which are articulated to a receiving part mounted to the frame of the motorcycle, said means for articulation including a hinge pin which is inserted in a receiving bore in the fork, and wherein the fork legs of said fork are located at a distance from the corresponding abutting surfaces of the receiving part.

3. A kickstand device according to claim 2, wherein the hinge pin supports a spherical ring mounted with zero play in its axial direction between the two legs of the fork, said spherical ring being received by a spherical bearing surface of the receiving part.

4. A kickstand device according to claim 3, wherein the receiving part projects between the two legs of the fork and in the parking position of the kickstand abuts the two fork legs under the load imposed on the kickstand by the motorcycle.

5. A kickstand device according to claim 2, 3, or 4, wherein said springs include two springs associated with the kickstand which are disposed on the side of the kickstand which faces the lengthwise center plane of the motorcycle, wherein the fork leg facing the springs is beveled at an acute angle on the inside face of its free end segment beginning at the center of the receiving bore for the hinge pin, and wherein the free end segment of the receiving part is beveled at the same angle beginning at the center of the spherical bearing surface on its abutting surface which faces away from the beveled fork leg.

* * * * *